(12) United States Patent
Chen et al.

(10) Patent No.: US 10,641,717 B2
(45) Date of Patent: May 5, 2020

(54) MOVABLE ARTICLE INSPENTION SYSTEM AND INSPECTION METHOD

(71) Applicant: NUCTECH COMPANY LIMITED, Beijing (CN)

(72) Inventors: Zhiqiang Chen, Beijing (CN); Yuanjing Li, Beijing (CN); Shangmin Sun, Beijing (CN); Yu Hu, Beijing (CN); Xuejing Yang, Beijing (CN); Qiangqiang Wang, Beijing (CN); Long Du, Beijing (CN); Wei Li, Beijing (CN)

(73) Assignee: Nuctech Company Limited, Beijing (CN)

( * ) Notice: Subject to any disclaimer, the term of this patent is extended or adjusted under 35 U.S.C. 154(b) by 170 days.

(21) Appl. No.: 15/691,746

(22) Filed: Aug. 31, 2017

(65) Prior Publication Data

US 2018/0059068 A1 Mar. 1, 2018

(30) Foreign Application Priority Data

Aug. 31, 2016 (CN) .......................... 2016 1 0788659

(51) Int. Cl.
*G01N 23/10* (2018.01)
*G01V 5/00* (2006.01)
*G01N 27/90* (2006.01)

(52) U.S. Cl.
CPC .......... *G01N 23/10* (2013.01); *G01N 27/902* (2013.01); *G01V 5/0066* (2013.01);
(Continued)

(58) Field of Classification Search
None
See application file for complete search history.

(56) References Cited

U.S. PATENT DOCUMENTS 7,207,713 B2 * 4/2007 Lowman ............... B60P 1/5433
250/360.1
10,228,334 B2 * 3/2019 Roe ....................... G01V 5/0033
(Continued)

FOREIGN PATENT DOCUMENTS

CN 1490616 A 4/2004
CN 104459813 A 3/2015
(Continued)

OTHER PUBLICATIONS

Valkovic Vladivoj et al: "Container Inspection Utilizing 14 MeV Neutrons", IEEE Transactions on Nuclear Science, IEEE Service Center, New York, Jun. 1, 2016, pp. 1536-1543.
(Continued)

*Primary Examiner* — Thomas R Artman
(74) *Attorney, Agent, or Firm* — Kilpatrick Townsend & Stockton LLP

(57) ABSTRACT

This invention relates to a movable article inspection system and inspection method, wherein the inspection system comprises: a first automated guided vehicle, a radiation source and a detection mechanism; said radiation source and said detection mechanism are both mounted on said first automated guided vehicle, said first automated guided vehicle is able to move to a preset scanning inspection position, such that scanning inspection of said article to be scanned is effectuated by means of relative movement between an article to be scanned and the first automated guided vehicle. Such movable inspection system based on an automated guided vehicle is capable of making full use of an existing automated guided vehicle and its control system to make a movement path of the inspection system more flexible, and capable of effectuating centralized control and management of the inspection system, so that it can improve inspection efficiency, and save labor cost.

13 Claims, 1 Drawing Sheet

(52) U.S. Cl.
CPC . *G01N 2223/301* (2013.01); *G01N 2223/639* (2013.01); *G01V 5/0025* (2013.01)

(56) References Cited

U.S. PATENT DOCUMENTS

| | | |
|---|---|---|
| 2004/0247075 A1 | 12/2004 | Johnson et al. |
| 2004/0258198 A1 | 12/2004 | Carver et al. |
| 2005/0100135 A1* | 5/2005 | Lowman ............... B60P 1/5433 378/198 |
| 2008/0025825 A1 | 1/2008 | Fujiwara |
| 2008/0089469 A1 | 4/2008 | Chen et al. |
| 2012/0257717 A1 | 10/2012 | Singh |
| 2013/0156156 A1* | 6/2013 | Roe ...................... G01V 5/0033 378/57 |
| 2015/0185356 A1* | 7/2015 | Tang .................... G01V 5/0016 378/57 |

FOREIGN PATENT DOCUMENTS

| | | |
|---|---|---|
| CN | 105445294 A | 3/2016 |
| CN | 206020304 U | 3/2017 |
| EP | 2889652 A1 | 7/2015 |
| JP | 2015049151 A | 3/2015 |

OTHER PUBLICATIONS

European Search Report dated Feb. 6, 2018 in the corresponding European application(application No. 17188241.8).
CN 2nd Office Action dated Jul. 19, 2018 in the corresponding CN application (application No. 201610788859.2).
CN 3rd Office Action dated Oct. 26, 2018 in the corresponding CN application (application No. 201610788859.2).

\* cited by examiner

MOVABLE ARTICLE INSPENTION SYSTEM AND INSPECTION METHOD

CROSS REFERENCE TO RELATED APPLICATION

The present application claims the priority to Chinese Patent Application No. 201610788859.2, titled "MOVABLE ARTICLE INSPENTION SYSTEM AND INSPECTION METHOD", filed on Aug. 31, 2016 with the State Intellectual Property Office of the PRC, which is incorporated herein by reference in its entirety.

FIELD OF THE INVENTION

The present invention relates to a security inspection technique, and in particular relates to a movable article inspection system and inspection method.

BACKGROUND OF THE INVENTION

In all kinds of ports, there is a general need to use a scanning inspection system to inspect an article in a container so as to ensure the safety of transporting an article. In order to inspect containers at each location flexibly and conveniently, currently there is a general use of a movable container inspection system.

In the prior art, two manners are normally used to effectuate movement of the inspection system. One manner is to use a universal truck chassis, so that a container inspection system is carried on a chassis vehicle, in order to achieve the mobility of the entire inspection system. Another manner is to use a track means, so that an inspection system is driven to move on a track, in order to achieve the mobility of the entire inspection system.

In the above two movement manners, the first manner may be limited by emission of the chassis vehicle, left rubber/right rudder as well as other relevant road regulations, and there is a need for an operator to perform steering control on a vehicle so as to effectuate movement of the entire inspection system. The second manner which is directed to satisfy the requirement of flexible movement makes it necessary to lay tracks of various paths, and moreover, it is limited as there is a need for use in a fixed site.

Further, for an intelligent and integrated port, there may be a substantial use of unmanned automated guided vehicle (Automated Guided Vehicle, referred to as AGV for short) system to effectuate container transport, so that a movable container inspection system as a link of a port makes it necessary for centralized management and control, and makes it necessary for effectuating unattended operation on an inspection system. However, such two existing current mobile inspection systems present a poor flexibility, and cannot achieve centralized control, so that it is difficult to meet the needs of current intelligent ports.

SUMMARY OF THE INVENTION

It is an object of the present invention to provide a movable article inspection system and an inspection method, capable of more flexibly and conveniently performing scanning inspection of an article to be scanned.

In order to realize the aforementioned object, the present invention provides a movable article inspection system, comprising: a first automated guided vehicle, a radiation source and a detection mechanism; the radiation source and the detection mechanism are both mounted on the first automated guided vehicle, the first automated guided vehicle is able to move to a preset scanning inspection position, such that scanning inspection of the article to be scanned is effectuated by means of relative movement between an article to be scanned and the first automated guided vehicle.

Further, the article to be scanned is loaded by a second automated guided vehicle for driving the article to be scanned to move relative to the first automated guided vehicle.

Further, the bottom of the radiation source is embedded into the first automated guided vehicle.

Further, the radiation source and the detection mechanism are both power supplied by a power supply unit of the first automated guided vehicle, or power supplied by a power supply device independent from the power supply unit of the first automated guided vehicle.

Further, the detection mechanism is rotatably mounted on the first automated guided vehicle, such as to effectuate that the detection mechanism is switched between a deployed state and a retracted state.

Further, there also comprise a rotary member provided on the first automated guided vehicle, and a support member by means of which the detection mechanism is mounted on the rotary member.

Further, the radiation source is mounted on the first automated guided vehicle; or the radiation source is mounted on the first automated guided vehicle by the rotary member.

Further, the detection mechanism comprises an L-shaped cantilever and a detector, on which the detector is disposed, the L-shaped cantilever being mounted on the first automated guided vehicle to form a door-type scanning frame for passing of the article to be scanned.

Further, an overall width of the movable article inspection system is no greater than a width of an advancing passage of the first automated guided vehicle.

Further, there comprise two radiation sources and two detection mechanisms, wherein the two radiation sources for emitting radiation respectively towards opposite sides of the first automated guided vehicle, and the two detection mechanisms being respectively mounted on the opposite sides of the first automated guided vehicle and for receiving the radiation emitted from the radiation sources of respective sides.

Further, there comprise one radiation source and two detection mechanisms, the radiation source for emitting radiation towards opposite sides of the first automated guided vehicle, the two detection mechanisms being respectively mounted on the opposite sides of the first automated guided vehicle and for receiving the radiation emitted from the radiation sources to the opposite sides.

In order to realize the aforementioned object, the present invention further sets forth an inspection method on the basis of the movable article inspection system, comprising steps as follows:

driving the first automated guided vehicle to move the radiation source and the detection mechanism to a preset scanning inspection position; and effectuating scanning inspection of the article to be scanned by means of relative movement between the article to be scanned and the first automated guided vehicle.

Further, the article to be scanned is loaded by a second automated guided vehicle, steps of the relative movement between the article to be scanned and the first automated guided vehicle comprising:

when scanning inspection is performed on the article to be scanned, the first automated guided vehicle is stationary, and the second automated guided vehicle moves; or the first automated guided vehicle moves, and the second automated guided vehicle is stationary.

Further, the detection mechanism is rotatably mounted on the first automated guided vehicle, the movable vehicle-mounted article inspection method further comprising that:

when the first automated guided vehicle drives the radiation source and the detection mechanism to move, the detection mechanism is switched to the retracted state; and when the first automated guided vehicle drives the radiation source and the detection mechanism to move to a preset scanning inspection position, the detection mechanism is switched to the deployed state.

On the basis of the aforementioned technical solution, the movable article inspection system of the present invention, which mounts the radiation source and the detection mechanism on the first automated guided vehicle, is capable of moving to a preset scanning inspection position under the dispatch of a control system in an intelligent port, and by means of relative movement between an article to be scanned and the first automated guided vehicle, effectuate scanning inspection of the article to be scanned. Such movable inspection system based on an automated guided vehicle can make full use of the structure and control system of an existing automated guided vehicle, which can make a movement path of the inspection system more flexible, and capable of effectuating centralized control and management of the inspection system, so that it can improve the inspection efficiency, and save the labor cost. In addition, there is also no need to renovate a site of the automated guided vehicle, and there is no need to occupy a fixed area.

BRIEF DESCRIPTION OF THE ACCOMPANYING DRAWINGS

The drawings described herein are used to provide a further understanding of the present invention and constitute a part of the present application. The illustrative embodiments of the present invention as well as the descriptions thereof, which are used for explaining the present invention, do not constitute improper definitions on the present invention. In the drawings.

DETAILED DESCRIPTION OF THE PREFERRED EMBODIMENTS

Figure 1:
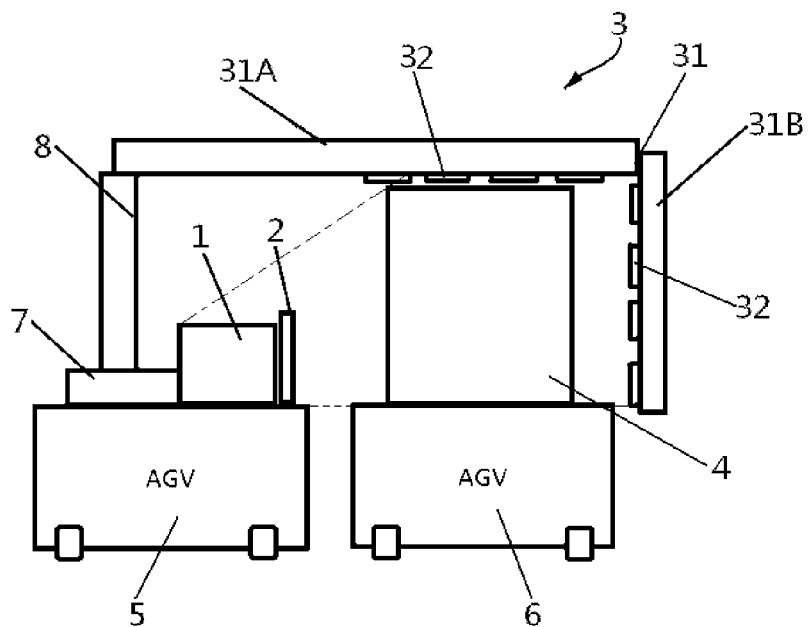
FIG. 1 is a front view of an embodiment of the movable article inspection system of the present invention.

Next, the technical solution of the present invention is further described in detail by means of the drawings and embodiments.

The terms such as "first" and "second" recited in the present invention are only for the convenience of description, so as to distinguish different constituent parts having the same term rather than presenting a sequential or dominant relation. In the describing process, if there involves the automated guided vehicle referred to in the drawings, a first automated guided vehicle and a second automated guided vehicle will be used for description, and if it means a universal automated guided vehicle, AGV is used for the convenience of description.

In the description of the present invention, there use such terms as "up", "down", "left" and "right" indicating an azimuth or positional relation, which are all based on corresponding directions when a vehicle advances, only for convenient description of the present invention rather than indicating or implying that the device referred to has to present a particular azimuth, and be constructed and operated in a particular azimuth, so that it cannot be understood as limiting the protection scope of the present invention.

With regard to the defects of the existing movable inspection system, the inventor notes that: on one hand, for partial intelligent ports, especially intelligent ports that have already been implemented and accomplished in planning, as AGV carrying a container needs to perform lane-changing and steering at any position when moving, without a fixed path, thus it is required that the mobile inspection system presents a flexible movement path. On the other hand, it is necessary to enable the mobile inspection system to effectuate centralized automatic control without manipulation of an operator on a vehicle.

On the basis of the target demands set forth in such two aspects, there are still several limiting factors in practice. For example, magnetic nails of an equipment that guides an AGV are throughout the entire AGV advancing site, it is rather difficult for secondary civil engineering on the basis of the container inspection system, and moreover, it is also hard to find a fixed area for all AGV equipments passing.

Thus, the inventor has contemplated that if an AGV-carried inspection system can be utilized to apply mature AGV structure, motion and control techniques to an inspection system, the inspection system may flexibly move to a position necessary for scanning inspection so as to inspect a container, without renovating a site of an intelligent port.

On the basis of the above-mentioned concept, the present invention proposes a movable article inspection system, hereinafter referred to as "inspection system" for short, the structure of which is shown in the schematic views of FIGS. 1 and 2. In an illustrative embodiment, the movable article inspection system comprises: a first automated guided vehicle 5, a radiation source 1 and a detection mechanism 3 having a detector 32; the radiation source 1 and the detection mechanism 3 are both mounted on the first automated guided vehicle 5, the first automated guided vehicle 5 is used as a chassis of the inspection system, which is able to move to a preset scanning inspection position, such that scanning inspection of the article to be scanned is effectuated by means of relative movement between the article to be scanned and the first automated guided vehicle 5

Among them, the radiation source 1 is capable of emitting radiation for irradiating an article to be scanned, such as an X-ray accelerator. The detector 32 is used for receiving the radiation transmitted by the radiation source 1 when the article to be scanned is irradiated, and further acquiring an interior condition of the article to be scanned by image processing. In order to enable the detector 32 to accurately receive the radiation from the radiation source 1, a plurality of detectors 32 may be mounted on the detection mechanism 3, and a detection face of the detector 32 is directed toward the radiation source 1. Further, a collimator 2 may also be provided between the radiation source 1 and the detection mechanism 3, for forming a collimated radiation beam from the radiation emitted by the radiation source 1.

It is necessary to explain that, the preset scanning inspection position which is determined according to actual demands, may be a position which is convenient for all the articles to be scanned can reach jointly, or a scanning position flexibly selected according to a transport path of an article to be scanned.

In the scanning inspection process, the scanning equipment can perform automatic detection judgment and control the radiation source 1 to generate and stop the radiation, so as to complete the full scan of an article to be scanned. The scanned images may be transmitted into an image inspection station via wireless network, for inspection and analysis by an image inspector.

The movable article inspection system of the embodiment of the present invention, takes AGV as a movable platform of the inspection system, only requiring an improvement on the basis of the mature AGV technology in combination with actual demands. The application of the AGV technology to the inspection system has advantages at least in the following aspects:

(1) By incorporating the entire AGV control system into inspection system, optimum control may be utilized to achieve the scan, without occupying an advancing passage of AGV for long by optionally moving to other locations when scanning is unnecessary, thereby reducing the influence over the procedure of a port as much as possible. Moreover, it is possible to effectively satisfy the demands of inspection examination within an intelligent unmanned port, so as to lay a foundation for providing a solution of an entire system of a port.

(2) The inspection system is enabled to automatically move to a preset scanning inspection position under the dispatch of a control system in an intelligent port so as to, by means of relative movement between an article to be scanned and the first automated guided vehicle, effectuate scanning inspection of the article to be scanned. The inspection system is capable of effectuating centralized control and management, without manipulation of an operator on a vehicle, so that it can improve the inspection efficiency, and save the labor cost.

(3) The motion path of the inspection system within a port can be made more flexible, and a preset scanning inspection position may be flexibly selected.

(4) For an occasion in which transport of an article to be scanned is realized by AGV, it is unnecessary to renovate a site of AGV, and the inspection system is also not required to occupy a fixed area.

(5) If the inspection system is malfunctioned, it is possible to drive to a maintenance area for equipment maintenance, without affecting other transport and inspection operations.

In addition, the article to be scanned referred to in the embodiment may be various categories of articles required to be inspected by the port or the customs, for example the container 4. The article to be scanned upon inspection may be placed on a fixed platform, or may be loaded on a mobile vehicle body, for example on AGV or other types of vehicles.

In one embodiment, as shown in FIG. 1, the article to be scanned is loaded by a second automated guided vehicle 6 for driving the article to be scanned to move, so that the article to be scanned moves relative to the first automated guided vehicle 5, to effectuate scanning inspection of the article to be scanned.

When scanning inspection is performed of the article to be scanned, a relative movement between the article to be scanned and the inspection system will take place, and the relative movement may be selected from the following circumstances:

Firstly, the first automated guided vehicle 5 is stationary, so that the scanning system is maintained in a stationary state, and the second automated guided vehicle 6 automatically drives the article to be scanned to move. In the embodiment, the scanning system which maintains stationary, is capable of avoiding jitter of the radiation source 1 and the detection mechanism 3 as much as possible, so as to ensure the accuracy of the inspection.

Secondly, the first automated guided vehicle 5 moves, and the second automated guided vehicle 6 is stationary. For the circumstance that the second automated guided vehicle 6 has transported the article to be scanned to a target position so that it is unnecessary to perform further movement, such embodiment may flexibly satisfy the scanning inspection demands by movement of the inspection system.

Thirdly, the first automated guided vehicle 5 and the second automated guided vehicle 6 are both in a movement state, but the movements thereof are asynchronous.

In the above-described embodiment, the amounts of the radiation source 1 and the detector 32 are not particularly limited. Next, several optional forms will be provided below.

In a structural form, it is possible to only provide one radiation source 1 and one detection mechanism 3, the detection mechanism 3 is located on the left or right side of the first automated guided vehicle 5 to inspect the article to be scanned. The embodiment is capable of saving the space occupied by the entire inspection system in a width direction.

In another structural form, the inspection system comprises two radiation sources 1 for emitting radiation respectively towards opposite sides of the first automated guided vehicle 5, and two detection mechanisms 3 respectively mounted on the opposite sides of the first automated guided vehicle 5, and for receiving the radiation emitted from the radiation sources 1 of respective sides. The embodiment is capable of making full use of the space on the first automated guided vehicle 5, and simultaneously inspecting the articles to be scanned on the left and right sides of the first automated guided vehicle 5, so as to improve the inspection efficiency.

In a further structural form, the inspection system comprises one radiation source 1 mounted on the first automated guided vehicle 5 for emitting radiation towards opposite sides of the first automated guided vehicle 5, and two detection mechanisms 3 respectively mounted on the opposite sides of the first automated guided vehicle 5, and for receiving the radiation emitted from the radiation sources 1 to the opposite sides. The embodiment can reduce the space occupied by the radiation source 1 and also save the cost whilst improving the inspection efficiency.

In order to be able to better inspect an article to be scanned, the inspection system is not simply placed on the first automated guided vehicle 5, but requires transformation of the AGV, including the hardware and control systems and so on.

Considering that the existing AGV body is very large, in order to allow the entire inspection system to occupy less space and to have sufficient space for passing of an article to be scanned, a length and width of the existing AGV may be reduced. Further, considering that the inspection system loading by AGV is very light in weight compared with an article to be scanned, the bearing capability of AGV may also be further weakened. All these improvements may reduce the cost of the inspection system.

Further, considering that the radiation emitted by the radiation source 1 has certain flare angle, and the bottom of the scanning device is not the bottom edge of the radiation source 1, it is preferable that the bottom of the radiation source 1 is embedded into the first automated guided vehicle 5, and it is best that the portion of the scanning device located below the bottom edge of the radiation source 1 is all embedded into the first automated guided vehicle 5. The improvements made in the embodiment enable effectuating a complete scan of an article to be scanned.

Further, it is also necessary to consider the power supply of the inspection system.

In a power supply form, the radiation source 1 and the detection mechanism 3 are both power supplied by the power supply unit of the first automated guided vehicle 5. The existing AGV is generally power supplied by using a lithium battery, and moreover, a lithium battery may be charged, so that the radiation source 1 and the detection mechanism 3 in the scanning device are also power supplied by a lithium battery. Such power supply form does not require a power supply unit additionally provided for the scanning apparatus, so that it makes minor modifications to AGV with a simple structure, and is capable of avoiding that the inspection system is affected by vibration due to provision of an additional power supply device.

In another power supply form, the radiation source 1 and the detection mechanism 3 are power supplied by a power supply device independent from the power supply unit of the first automated guided vehicle 5. For example, a generator is mounted on the first automated guided vehicle 5, to independently supply power to the radiation source 1 and the detection mechanism 3 in the scanning device. In such power supply form, the scanning apparatus which does not consume the electric power of the first automated guided vehicle 5, makes more sufficient power consumption of the entire inspection system, and reduces the problem of the entire inspection system in frequent charging or stopping working resulting from insufficient power supply. Further, after completion of the charging once, it is also possible to allow the first automated guided vehicle 5 to be used for a longer time.

For the detection mechanism 3 in the aforementioned embodiment, in a structural form, as shown in FIG. 1, the detection mechanism 3 may comprise an L-shaped cantilever 31, on which the detector 32 is disposed, the L-shaped cantilever 31 being provided on the first automated guided vehicle 5 by means of a mounting structure, so as to form a door-type scanning frame for passing of the article to be scanned. When the second automated guided vehicle 6 bears an article to be scanned passing from the door-type scanning frame, the radiation with a flaring angle emitted by the radiation source 1 may pass through the article to be scanned such as to be received by the detector 32. The advantage of providing the L-shaped cantilever 31 lies in that all the radiations passing through an article to be scanned may be comprehensively received in horizontal and vertical directions.

Specifically, the L-shaped cantilever 31 includes a cross arm 31A with a first end provided on the first automated guided vehicle 5 by means of a mounting structure, and a vertical arm 31B with a first end mounted at a second end of the cross arm 31A and a second end that is a free end.

In an improved embodiment, the detection mechanism 3 is rotatably mounted on the first automated guided vehicle 5, such that the detection mechanism 3 can be switched between a deployed state and a retracted state. Preferably, the detection mechanism 3 is rotatable within a horizontal plane.

Under a scanning condition, the detection mechanism 3 is in the deployed state to inspect an article to be scanned; under an advancing condition, the detection mechanism 3 is in the retracted state so that a width of the entire inspection system is reduced to a width of the first automated guided vehicle 5, and there is only a need to occupy a narrow advancing passage. At this time, the inspection system is equivalent to an AGV device, receiving unified dispatch of the AGV control system. Further, the retraction of the detection mechanism 3 under an advancing state can also ensure the traveling safety, and avoid the detection mechanism 3 from being damaged.

In a specific structural form, the inspection system also comprises a rotary member 7 provided on the first automated guided vehicle 5, and a support member 8 by means of which the detection mechanism 3 is mounted on the rotary member 7. The rotary member 7 may be driven by a driving member such as an electric motor, and the rotary member 7 may be designed to be a turntable or the like.

For the detection mechanism 3 including the L-shaped cantilever 31, specifically, the first end of the cross arm 31A is mounted on the support member 8. Under an advancing condition, the L-shaped cantilever 31 is integrally rotated 90° within the horizontal plane so that the cross arm 31A of the L-shaped cantilever 31 is parallel to a length direction of the vehicle body. With reference to FIG. 2, the detection mechanism 3 after rotation does not affect normal operation of other AGVs in the advancing passage.

Further, for the installation of the radiation source 1 and the collimator 2, two installation forms may be used.

Figure 2:
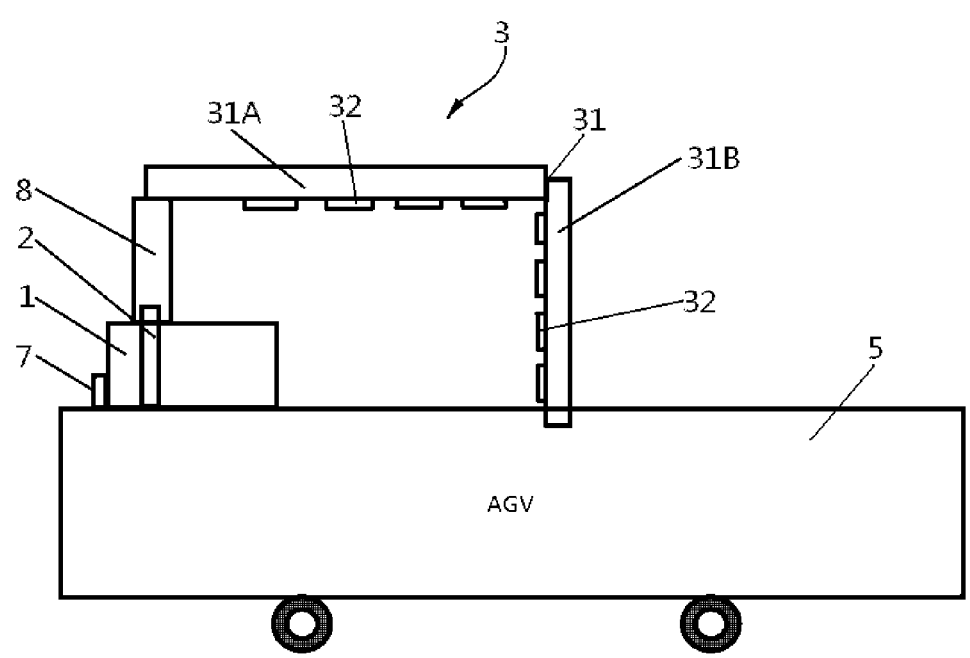
FIG. 2 is a side view of the movable article inspection system shown in FIG. 1.

In a structural form, as shown in FIG. 1 and FIG. 2, the radiation source 1 and the collimator 2 are directly mounted on the first automated guided vehicle 5 so that the direction of the radiation emitted by the radiation source 1 is fixed. When scanning is required, it is necessary to rotate the detection mechanism 3 to a length direction perpendicular to the vehicle body, and adjust the detection mechanism 3 to a position directly facing the radiation source 1, so as to ensure the detection effect. The advantage of such structural form lies in that the volume of the rotary member 7 can be reduced.

In another structural form, the radiation source 1 and the collimator 2 are mounted on the first automated guided vehicle 5 by means of the rotary member 7, i.e., the radiation source 1 and the collimator 2 are mounted on the rotary member 7. When scanning is required, the detection mechanism 3 is rotated by the rotary member 7 to be perpendicular to a length direction of the vehicle body. At this time, the radiation source 1 and the collimator 2 are also rotated correspondingly to a position directly facing the detection means 3. The advantage of such structural form lies that, since the radiation source 1, the collimator 2 and the detection mechanism 3 are located on the same mounting reference, so that it is capable of improving the scanning inspection efficiency, and also capable of improving the scanning accuracy by omitting the steps of aligning various members of the scanning apparatus.

In another preferred embodiment of the present invention, an overall width of the movable article inspection system is no greater than a width of an advancing passage of the first automated guided vehicle 5. Among them, the width mentioned here refers to a width occupied by the entire inspection system after deployment of the detection mechanism 3, so that the inspection system of the embodiment may only occupy one AGV advancing passage regardless of an advancing condition or a scanning condition, without affecting adjacent AGV advancing passages, and improve the advancing safety of each AGV.

In intelligent ports, AGV mostly transports containers 4, and various containers 4 have roughly the same width, but different heights. In order to improve the versatility of the inspection system of the present invention, it is preferable to design the scanning channel in accordance with the container 4 having the greatest height. Specifically, it is best that the height of the cross arm 31A in the L-shaped cantilever 31 is provided to allow passage of the container 4 having the greatest height.

Next, the present invention further provides an inspection method of the movable article inspection system of the aforementioned various embodiments. In one embodiment, the inspection method comprises steps as follows:

driving the first automated guided vehicle 5 to move the radiation source 1 and the detection mechanism 3 to a preset scanning inspection position; and effectuating scanning inspection of the article to be scanned by means of relative movement between the article to be scanned and the first automated guided vehicle 5.

The embodiment which realizes the movability of the inspection system by means of AGV, is capable of making full use of the AGV control system to perform centralized control and management of the inspection system, thereby improving the inspection efficiency and saving the labor cost; and is capable of controlling the first automated guided vehicle 5 to move in accordance with an actually required path, thus improving the flexibility of the inspection.

In another embodiment of the present invention, the article to be scanned is loaded by a second automated guided vehicle 6, steps of the relative movement between the article to be scanned and the first automated guided vehicle 5 specifically comprising:

When scanning inspection is performed on the article to be scanned, the first automated guided vehicle 5 is stationary, and the second automated guided vehicle 6 moves; or the first automated guided vehicle 5 moves, and the second automated guided vehicle 6 is stationary.

In order to enable the inspection system to receive an order of the AGV control system and at the same time also to scan the article to be scanned loaded on the second automated guided vehicle 6 which travels into the inspection channel, it is necessary to combine the AGV control system and the scanning system of the scanning device.

In a specific embodiment, the detection mechanism 3 comprises an L-shaped cantilever 31, on which the detector 32 is disposed, the L-shaped cantilever 31 being mounted on the first automated guided vehicle 5, so as to form a door-type scanning frame for passing of the article to be scanned. The scanning inspection steps of an article to be scanned specifically comprise: placing the article to be scanned within a passage formed by the door-type scanning frame, so as to perform scanning inspection of the article to be scanned.

For the inspection system in which the detection mechanism 3 is rotatably mounted on the first automated guided vehicle 5, the movable vehicle-mounted article inspection method further comprising the following steps:

when the first automated guided vehicle 5 drives the radiation source 1 and the detection mechanism 3 to move, the detection mechanism 3 is switched to the retracted state;

when the first automated guided vehicle 5 drives the radiation source 1 and the detection mechanism 3 to move to a preset scanning inspection position, the detection mechanism 3 is switched to a deployed state.

The embodiment which can switch the detection mechanism 3 into different states according to different operational conditions of the inspection system, is capable of meeting the functional requirements of the scanning inspection and enabling the inspection system to occupy a narrow advancing passage under an advancing condition, so as to ensure the traveling safety, and avoid the detection mechanism 3 from being damaged.

Finally, it should be explained that: the aforementioned embodiments are only used to describe the technical solution of the present invention rather than limiting the same; although detailed explanations are made to the present invention by referring to preferred embodiments, a common technical person in the art should understand that: it is still possible to make amendments to the embodiments of the present invention or make equivalent replacements to part of the technical features, for example, replacements are made by using different radiation sources and detection mechanisms; without departing from the spirit and scope of the present invention, they should all be covered in the scope of the technical solution for which protection is sought in the present invention.

The invention claimed is:

1. A movable article inspection system, comprising: a control system, a first automated guided vehicle, a radiation source and a detection mechanism; said radiation source and said detection mechanism are both mounted on said first automated guided vehicle, said first automated guided vehicle is able to move to a preset scanning inspection position under the dispatch of the control system without manipulation of an operator on a vehicle, such that scanning inspection of said article to be scanned is effectuated by means of relative movement between an article to be scanned and the first automated guided vehicle; wherein said article to be scanned is loaded by a second automated guided vehicle for driving said article to be scanned to move relative to said first automated guided vehicle.

2. The movable article inspection system according to claim 1, wherein the bottom of said radiation source is embedded into said first automated guided vehicle.

3. The movable article inspection system according to claim 1, wherein said radiation source and said detection mechanism are both power supplied by a power supply unit of said first automated guided vehicle, or power supplied by a power supply device independent from the power supply unit of said first automated guided vehicle.

4. The movable article inspection system according to claim 1, wherein said detection mechanism is rotatably mounted on said first automated guided vehicle, such that said detection mechanism can be switched between a deployed state and a retracted state.

5. The movable article inspection system according to claim 4, further comprising a rotary member provided on said first automated guided vehicle, and a support member (8) by means of which said detection mechanism is mounted on said rotary member.

6. The movable article inspection system according to claim 5, wherein said radiation source is mounted on said first automated guided vehicle; or said radiation source is mounted on said first automated guided vehicle by said rotary member.

7. The movable article inspection system according to claim 1, wherein said detection mechanism comprising an L-shaped cantilever and a detector, on which said detector is disposed, said L-shaped cantilever being mounted on said first automated guided vehicle to form an inspection channel for passing of said article to be scanned.

8. The movable article inspection system according to claim 1, wherein an overall width of said movable article inspection system is no greater than a width of an advancing passage of said first automated guided vehicle.

9. The movable article inspection system according to claim 1, comprising two said radiation sources and two said detection mechanisms, wherein said two radiation sources for emitting radiation respectively towards opposite sides of said first automated guided vehicle, and said two detection mechanisms being respectively mounted on the opposite sides of said first automated guided vehicle and for receiving the radiation emitted from said radiation sources of respective sides.

10. The movable article inspection system according to claim 1, comprising one said radiation source and two said detection mechanisms, said radiation source for emitting radiation towards opposite sides of said first automated guided vehicle, two said detection mechanisms being respectively mounted on the opposite sides of said first automated guided vehicle and for receiving the radiation emitted from said radiation sources to the opposite sides.

11. An inspection method of the movable article inspection system according to claim 1, comprising steps as follows:
   driving said first automated guided vehicle to move said radiation source and said detection mechanism to a preset scanning inspection position; and
   effectuating scanning inspection of said article to be scanned by means of relative movement between said article to be scanned and said first automated guided vehicle.

12. The inspection method of the movable article inspection system according to claim 11, wherein said article to be scanned is loaded by a second automated guided vehicle, steps of the relative movement between said article to be scanned and said first automated guided vehicle comprising:
   when scanning inspection is performed on said article to be scanned, said first automated guided vehicle is stationary and said second automated guided vehicle moves; or said first automated guided vehicle moves, and said second automated guided vehicle is stationary.

13. The inspection method of the movable article inspection system according to claim 11, wherein said detection mechanism is rotatably mounted on said first automated guided vehicle, said inspection method further comprising:
   when said first automated guided vehicle drives said radiation source and said detection mechanism to move, said detection mechanism is switched to a retracted state; and
   when said first automated guided vehicle drives said radiation source and said detection mechanism to move to a preset scanning inspection position, said detection mechanism is switched to a deployed state.

* * * * *